United States Patent
Mongeon et al.

(10) Patent No.: US 10,984,355 B2
(45) Date of Patent: Apr. 20, 2021

(54) EMPLOYEE TASK VERIFICATION TO VIDEO SYSTEM

(71) Applicant: Xerox Corporation, Norwalk, CT (US)

(72) Inventors: Michael C. Mongeon, Walworth, NY (US); Robert Loce, Webster, NY (US); Matthew Shreve, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 529 days.

(21) Appl. No.: 14/689,320

(22) Filed: Apr. 17, 2015

(65) Prior Publication Data
US 2016/0307143 A1    Oct. 20, 2016

(51) Int. Cl.
| | |
|---|---|
| *G06Q 10/06* | (2012.01) |
| *G06T 7/246* | (2017.01) |
| *H04N 21/44* | (2011.01) |
| *G06F 3/01* | (2006.01) |
| *G06K 9/00* | (2006.01) |
| *H04N 5/77* | (2006.01) |

(52) U.S. Cl.
CPC ..... *G06Q 10/063114* (2013.01); *G06F 3/017* (2013.01); *G06K 9/00335* (2013.01); *G06K 9/00771* (2013.01); *H04N 5/77* (2013.01); *H04N 21/44008* (2013.01); *G05B 2219/31038* (2013.01); *G05B 2219/34045* (2013.01); *G05B 2219/42257* (2013.01); *G06K 9/00711* (2013.01); *G06T 7/246* (2017.01)

(58) Field of Classification Search
CPC combination set(s) only.
See application file for complete search history.

(56) References Cited

U.S. PATENT DOCUMENTS

| | | | | |
|---|---|---|---|---|
| 4,396,903 A | * | 8/1983 | Habicht | G06K 9/36 342/64 |
| 5,465,115 A | | 11/1995 | Conrad et al. | |
| 5,581,625 A | | 12/1996 | Connell | |
| 5,939,974 A | * | 8/1999 | Heagle | G06Q 10/06 340/286.09 |
| 5,953,055 A | | 9/1999 | Huang et al. | |

(Continued)

OTHER PUBLICATIONS

"Video Analytics Applications for the Retail Market, How Agent Vi Can Maximize Store Productivity and Add Value to Your Operations," Agent, Comprehensive Video Analytics Solutions, 2014, 8 pages, http://www.agentvi.com/images/Agent_Vi_-_Retail_Applications.pdf.

(Continued)

*Primary Examiner* — Crystol Stewart
(74) *Attorney, Agent, or Firm* — Fay Sharpe LLP

(57) ABSTRACT

When monitoring a workspace to determine whether scheduled tasks or chores are completed according to a predetermined schedule, a video monitoring system monitors a region of interest (ROI) to identify employee-generated signals representing completion of a scheduled task. An employee makes a mark or gesture in the ROI monitored by the video monitoring system and the system analyzes pixels in each captured frame of the ROI to identify an employee signal, map the signal to a corresponding scheduled task, update the task as having been completed upon receipt of the employee signal, and alert a manager of the facility as to whether the task has been completed or not.

18 Claims, 4 Drawing Sheets

(56) References Cited

U.S. PATENT DOCUMENTS

| | | | |
|---|---|---|---|
| 6,195,121 B1 | 2/2001 | Huang et al. | |
| 6,654,047 B2 | 11/2003 | Iizaka | |
| 6,995,664 B1* | 2/2006 | Darling | G08B 19/00 340/10.1 |
| 7,565,295 B1* | 7/2009 | Hernandez-Rebollar | G06K 9/00355 382/182 |
| 7,688,349 B2 | 3/2010 | Flickner et al. | |
| 7,693,758 B1* | 4/2010 | Bacco | G06Q 10/06 705/28 |
| 9,521,337 B1* | 12/2016 | Shen | H04N 5/3355 |
| 9,665,777 B2* | 5/2017 | Naikal | G06K 9/00771 |
| 2003/0078954 A1* | 4/2003 | Haughey | G06F 9/4881 718/102 |
| 2003/0086496 A1* | 5/2003 | Zhang | G06K 9/00711 375/240.16 |
| 2004/0102971 A1* | 5/2004 | Lipscher | G06F 17/279 704/236 |
| 2005/0283752 A1* | 12/2005 | Fruchter | G06F 17/3079 717/100 |
| 2007/0127774 A1* | 6/2007 | Zhang | G06K 9/00771 382/103 |
| 2009/0070163 A1* | 3/2009 | Angell | G06Q 10/04 705/7.26 |
| 2010/0332879 A1* | 12/2010 | Nakata | G06K 15/4055 713/323 |
| 2012/0075450 A1* | 3/2012 | Ding | G06K 9/00335 348/77 |
| 2013/0182272 A1* | 7/2013 | Lim | H04N 1/00888 358/1.13 |
| 2014/0140622 A1* | 5/2014 | Chattopadhyay | G06K 9/6282 382/182 |
| 2014/0176796 A1* | 6/2014 | Kalajan | H04N 21/64784 348/552 |
| 2014/0215624 A1* | 7/2014 | Suzio | G06F 21/554 726/23 |
| 2014/0359540 A1* | 12/2014 | Kelsey | G06F 3/017 715/863 |
| 2015/0120349 A1* | 4/2015 | Weiss | G06Q 10/06311 705/7.13 |
| 2015/0199810 A1* | 7/2015 | Lee | G06K 9/00771 382/103 |
| 2016/0070958 A1* | 3/2016 | Whelan | G06K 9/00335 382/107 |
| 2016/0140528 A1* | 5/2016 | Shaaban | G06F 17/40 705/34 |
| 2016/0162739 A1* | 6/2016 | Ishiguri | B61L 99/00 348/148 |
| 2016/0234464 A1* | 8/2016 | Loce | G06K 9/00711 |

OTHER PUBLICATIONS

A.W. Senior et al., "Video analytics for retail," IBM T. J. Watson Research Center, PO Box 704, Yorktown Heights, NY 10598, USA, 6 pages, http://rogerioferis.com/publications/FerisAVSS07b.pdf.

SCOPIX Solutions, http://www.scopixsolutions.com/solutions/.

Matt Scnmitt, "Checking in on "Minority Report" Video Analytics and Hyper-Targeting in Retail," Feb. 3, 2011, http://www.retailtouchpoints.com/in-store-insights/714-checking-in-on-minority-report-video-analytics-and-hyper-targeting-in-retail.

Honeywell, "Capabilities Overview, Intelligent Video Analytics for: The Retail Applications Market," Sep. 2007, 4 pages, http://www.security.honeywell.com/uk/video/docunients/VideoAnalytics_Retail_UK.pdf.

Matt Pillar, "Real Value in Video Analytics?," Jul. 26, 2010, 2 pages, http://www.retailsolutionsonline.com/doc.mvc/Real-Value-In-Video-Analytics-0001.

Verlin Youd, "Video Analytics Solutions Help Retailers Optimize Customer Service and Workforce Management," Dec. 9, 2011, 6 pages, http://www.retailtouchpoints.com/retail-store-ops/1230--video-analytics-solutions-help-retailers-optimize-customer-service-and-workforce-management-.

* cited by examiner

EMPLOYEE TASK VERIFICATION TO VIDEO SYSTEM

TECHNICAL FIELD

The presently disclosed embodiments are directed toward automatically updating a schedule for completing tasks using a video capture system. However, it is to be appreciated that the present exemplary embodiments are also amenable to other like applications.

BACKGROUND

Due to the advances and increased availability of surveillance technology over the past few decades, it has become increasingly common to capture and store video footage of retail settings for the protection of companies, as well as for the security and protection of employees and customers. However, this data has also been of interest to retail markets for its potential for data-mining and estimating consumer behavior and experience. Modern retail processes are becoming heavily data driven, and retailers therefore have a strong interest in numerous customer and store metrics such as queue lengths, experience time in-store and drive-through, specific order timing, order accuracy, and customer response.

There is a need in the art for systems and methods that facilitate monitoring employee task completion by detecting employee-provided task completion signals in captured video, while overcoming the aforementioned deficiencies.

BRIEF DESCRIPTION

In one aspect, a method for verifying task completion via a video system comprises monitoring via one or more video cameras a region of interest (ROI), and analyzing pixels in the ROI in video frames captured by the one or more video cameras whether an employee signal has been detected in the region of interest. The method further comprises, upon detection of an employee signal: identifying a task corresponding to the detected employee signal; updating a task schedule for the identified task to indicate completion of the task; and generating and transmitting a task completion alert message indicative of completion of the identified task.

In another aspect, a video system that facilitates verifying task completion in a retail or service environment comprises one or more video cameras that monitor a region of interest (ROI), and a processor configured to analyze pixels in the ROI in video frames captured by the one or more video cameras whether an employee signal has been detected in the region of interest. Upon detection of an employee signal, the processor is further configured to identify a task corresponding to the detected employee signal, update a task schedule for the identified task to indicate completion of the task, and generate and transmit a task completion alert message indicative of completion of the identified task.

In yet another aspect, a method of verifying task completion in a retail or service environment comprises monitoring a scene with one or more video cameras, defining a region of interest (ROI) within the scene for detecting employee signal events, and analyzing the ROI to detect employee signal events. The method further comprises classifying a detected signal event as corresponding to a completed task, updating a task completion schedule based on the classified signal event, and generating transmitting a task completion alert message indicative of the completed task.

DETAILED DESCRIPTION

Figure 1:
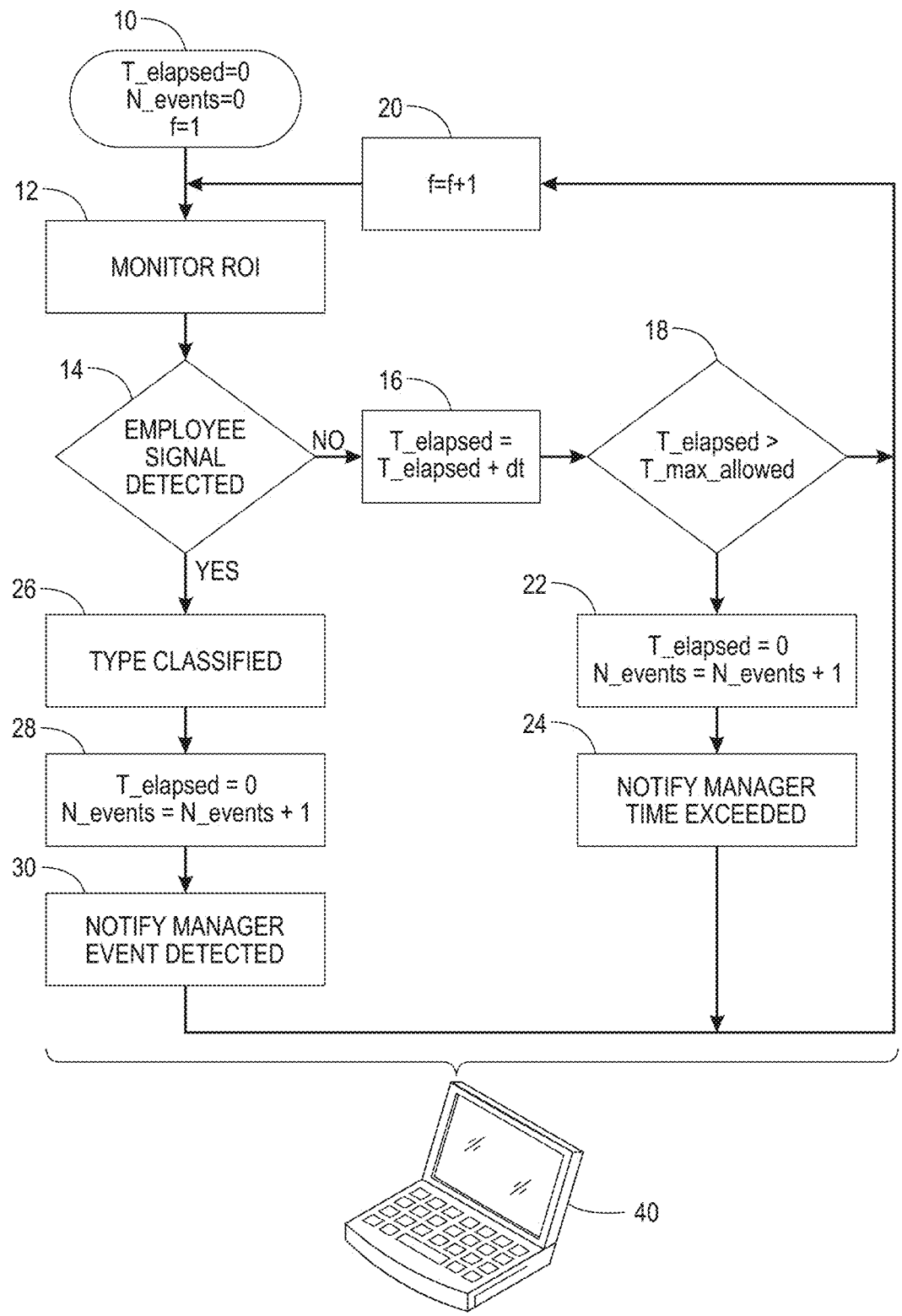
FIG. 1 illustrates a method that facilitates employee verification of task completion to a video system, in accordance with one or more aspects described herein.

FIG. 1 illustrates a method that facilitates employee verification of task completion to a video system, in accordance with one or more aspects described herein. In the flowchart of FIG. 1, T_elapsed is the time elapsed since a last detection of an employee signal indicating completion of a given task. N_events is the number of times an employee signal event has been detected. f is the frame number for the video frame being analyzed by the video system. dt is the time between frame captures. T_max_allowed represents an upper time limit for detecting the employee signal for which the video system is monitoring the scene.

According to the method, event monitoring is initialized at 10 by setting T_elapsed=0; N_events=0; and f=1 (i.e., a first video frame in a sequence). At 12, the scene (e.g., an employee break room or the like) is monitored (see, e.g., FIG. 3). At 14, a region of interest (ROI) such as a whiteboard or the like is analyzed to detect an employee signal. If no signal is detected at 14, then T_elapsed is incremented at 16. At 18, a determination is made regarding whether an upper time limit for receiving the employee signal has elapsed. For instance, if the task is taking out the trash and is scheduled to be performed every two hours, then the upper time limit T_max_allowed is two hours.

If T_elapsed does not exceed T_max_allowed at 18, then the method proceeds to 20, where the frame number f is advanced and the method is reiterated on the subsequent frame. If T_elapsed exceeds T_max_allowed as determined at 18, then at 22 the timer is restarted by setting T_elapsed to 0, and the number of detected events N_events is incremented. An appropriate party (e.g., a manager) is notified at 24 that time has expired for completion of the task (i.e., task completion is overdue). The notification provided to the manager is treated by the video system as an event detection, which is why the event detection count N_events is incremented at 22 despite the absence of an actual event detection at 14. For example, an override option can be provided to the store manager to get the employee to maintain the store resource, or reset the system software.

If a signal is detected 14, then at 26, the signal is classified. For instance, the video system can store a plurality of employee signals that correspond to a plurality of respective tasks (e.g., trash removal, restroom cleaning, napkin restocking, status checking for respective resources, etc.). Once the signal has been classified, the timer is reset by setting T_elapsed to zero, and N_events is incremented for the given event type (determined by the classifier) at 28. At 30, a manager or other appropriate party is notified of the event detection and the task completion indicated thereby.

In one example, the signal the employee inputs to the system is a gesture, such as waving or holding up a number of fingers, etc. For instance, the employee can stand in a designated region (the monitored ROI) and wave above his head to indicate the a first task is complete, wave at shoulder level to indicate a second task is complete, or wave at waist level to indicate a third task has been completed. In another example, the employee holds of a number of fingers (1-10) to indicate completion of 10 different task types. In yet another example, the employee uses one or both hands to draw a figure or shape (e.g., a box, a triangle, a circle, a character or number such as a letter A or a figure-eight, etc.) where each figure or shape corresponds to a respective task (e.g., stored in a lookup table in a memory of the video system).

Examples of hand gesture recognition protocols that can be employed in conjunction with the various aspects described herein are described, for instance, in "Hand Gesture Recognition: A Literature Review," by Khan and Ibraheem, International Journal of Artificial Intelligence & Applications (IJAIA), Vol. 3, No. 4, July 2012, pp. 161-174, which is hereby incorporated by reference herein in its entirety. To paraphrase that document, the segmentation process is the first process for recognizing hand gestures. Segmentation is the process of dividing an input image (in this case hand gesture image) into regions separated by boundaries. The segmentation process depends on the type of gesture. If the gesture is a dynamic gesture then the hand gesture is located and tracked. If the gesture is static gesture (e.g., posture) then the input image need only be segmented. Skin color can be used to identify pixels corresponding to the hand in each frame (e.g., using a Kalman filter or the like), and the skin colored pixels can be tracked across frames.

Once segmentation is complete, feature extraction is performed. Features vector of the segmented image can be extracted in different ways according to particular application. Some feature extraction methods use the shape of the hand such as hand contour and silhouette, while others utilize fingertips position, palm center, aspect ratio of the bounding box, pixel brightness, etc. Other techniques involve Self-Growing and Self-Organized Neural Gas (SGONG) neural algorithms to capture the shape of the hand, and then obtain three features: Palm region, Palm center, and Hand slope. Still other approaches relate to calculating a center of gravity of the segmented hand, to dividing the segmented image into different blocks size wherein each block represents the brightness measurements in the image, and to using a Gaussian pdf to extract geometric central moment as local and global features.

Once feature extraction is complete, the gesture is classified and recognized. For instance, gesture classification can be performed using one or more of the following techniques without limitation: a Euclidean distance metric used to classify the gestures; Statistical tools used for gesture classification; Finite State Machine (FSM); Learning Vector Quantization; Principal Component Analysis (PCA); a neural network technique; Fuzzy C-Means clustering (FCM); Genetic Algorithms (Gas), etc.

According to another example, the employee stands in the ROI and holds up a predesignated image or picture to indicate that a given task has been completed. For instance, the employee might hold up a picture of a sailboat to indicate that a first task has been completed, or a picture of a fire truck to indicate that a second task has been completed, etc. Additionally or alternatively, the employee can stand in the ROI and hold up a trained placard or sign with words or phrases describing the completed task. In another example, a white board or other surface in the ROI is pre-populated with the tasks that require periodic completion, and the employee checks a box next to the completed task. The employee can immediate erase the checkmark if desired since the video system has captured at least one frame with the checked box.

It will be appreciated that the method of FIG. 1 can be implemented by a computer 40, which comprises a processor (such as the processor 104 of FIG. 2) that executes, and a memory (such as the memory 106 of FIG. 2) that stores, computer-executable instructions for providing the various functions, etc., described herein.

The computer 40 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 40 can include a processing unit (see, e.g., FIG. 2), a system memory (see, e.g., FIG. 2), and a system bus (not shown) that couples various system components including the system memory to the processing unit. The processing unit can be any of various commercially available processors. Multiple microprocessors and/or multi-core processor architectures also can be used as the processing unit.

The computer 40 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer through an input device (not shown) such as a keyboard, a pointing device, such as a mouse, stylus, voice input, or graphical tablet. The computer 40 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Figure 2:
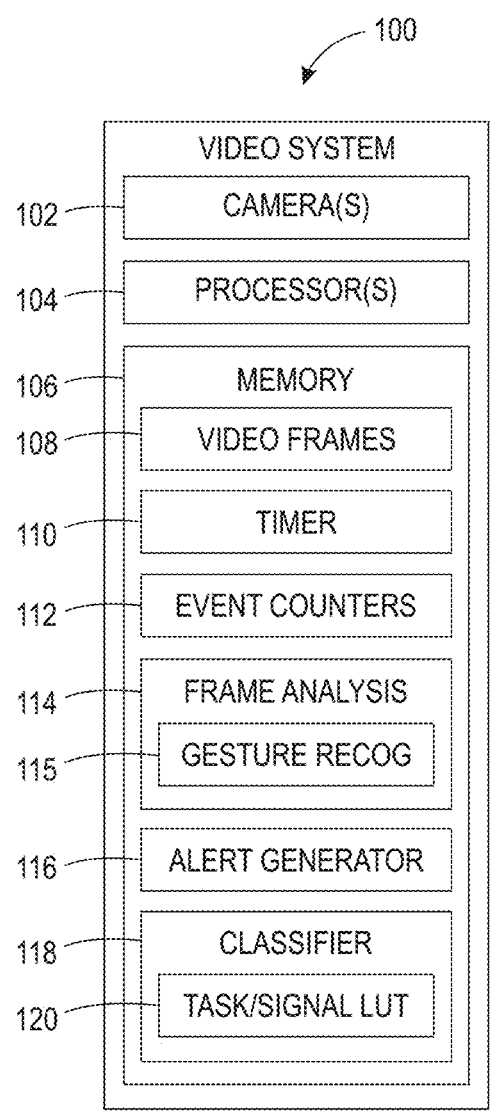
FIG. 2 illustrates a video system that facilitates an employee to communicate with a video system, in accordance with one or more aspects described herein.

FIG. 2 illustrates a video system 100 that facilitates an employee to communicate with a video system, in accordance with one or more aspects described herein. The system recognizes a signal from the employee and uses this signal to perform an action such as updating a task schedule and/or notifying a manager of task completion status. The video system 100 comprises one or more cameras 102 that monitor a scene (e.g., an employee break room or other area comprising a region of interest) and when the video system detects an employee signal, the system performs the action. In a given setting, video analysis is applied at a given frame rate, and the video system performs a function using image processing.

To this end, the video system 100 further comprises a processor 104 that executes computer-executable instructions stored on a computer-readable medium (memory) 106 for performing the various functions described herein. It will be understood that the processor 104 executes, and the memory 106 stores, computer executable instructions for carrying out the various functions and/or methods described herein. The memory 106 may be a computer-readable medium on which a control program is stored, such as a disk, hard drive, or the like. Common forms of computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor 104 can read and execute. In this context, the described systems may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics processing unit (GPU), or PAL, or the like.

The memory stores video frames 108 captured by the camera(s) 102 for analysis by the processor 104. When monitoring a scene with comprising a ROI, the processor sets a timer 110 such that T_elapsed=0. The processor also sets each of a plurality of event counters 112 (each counter being responsible for counting detected signal events for a given task) to an initial value such that N_events=0. For each task, the processor executes a video frame analysis module 114 that analyzes pixels in the monitored region of interest to detect a change therein between frames that represents a signal by an employee that indicates a task completion. The video frame analysis module comprises a gesture recognition module 115 that recognizes employee gestures using one or more techniques such as are described above with regard to FIG. 1. If no signal is detected, then the processor increments T_elapsed on the timer by 1. The processor compares the T_elapsed value to an upper time limit to determine whether the upper time limit for receiving the employee signal has elapsed. For instance, if the task is cleaning a given room at a hotel and is scheduled to be performed every day, then the upper time limit T_max_allowed is 24 hours.

If T_elapsed does not exceed T_max_allowed, the processor advances frame number f and re-executes the video frame analysis module 114 for each task on the subsequent frame. If T_elapsed exceeds T_max_allowed as determined by the processor, then the timer is restarted by setting T_elapsed to 0, and the number of detected events N_events is incremented. An alert generator 116 generates a message that is transmitted or presented to an appropriate party (e.g., a manager) to indicate that time has expired for completion of a task (i.e., task completion is overdue). The notification provided to the manager is treated by the video system as an event detection, which is why the event detection count N_events is incremented despite the absence of an actual event detection. For example, an override option can be provided on a user interface (e.g., the manager's smartphone, a computer screen, etc.) to the store manager to get the employee to maintain the store resource, or reset the system software.

When the video frame analysis module and/or processor detects a signal event, the processor executes a classifier module 118 that classifies the signal event as representing completion of a specific task. The classifier module comprises a task/signal lookup table (LUT) 120 that correlates a plurality of employee signals to a plurality of respective tasks (e.g., trash removal, restroom cleaning, napkin restocking, status checking for respective resources, etc.). Once the signal has been classified, the processor resets the timer by setting T_elapsed to zero, and increments N_events for the given task type (determined by the classifier). The alert generator generates and displays a message for a manager or other appropriate party describing the event detection and the task completion indicated thereby.

In one example, the ROI is door to a restroom that is monitored by a camera. A sign or placard on the door can be flipped to indicate completion of a task such as cleaning the restroom so that the camera can capture at least one frame with the task completion signal (the flipped sign). The employee can then flip the sign back to its original side until the task is completed again.

In a related example, the sign has a different color on each side. When the sign is flipped, the video frame analysis module detects a color change from a first color to a second color that indicates completion of the task. The timer is incremented until T_max_allowed for the given task, and then the video frame analysis module expects to see the color change again back to the first color. If it does not, then a manager is alerted to the incomplete task. If the color change is detected, then the manager is alerted that the task has been completed.

According to another example, the processor counts signal detection events to a predetermined number of events before generating a task completion alert message via the alert generator module 116. For instance, restaurant bathrooms may be scheduled to be cleaned every 2 hours, with a deep cleaning every 12 hours. The system can be configured not to alert the manager to the completion of the regular 2-hour cleanings, but rather only send a task completion alert message upon completion of the deep cleaning. IN this example, an employee can provide a first signal (e.g., an X on a whiteboard, a hand gesture, or the like) to indicate regular cleaning completion, and a second signal (e.g., an O on the whiteboard, a second hand gesture, etc.) to indicate completion of the deep cleaning. The manager can still be alerted to incomplete regular cleanings.

The foregoing examples of tasks, task completion signals, environments in which the described systems and methods can be employed are provided by way of example only and not to be construed as limiting the described innovation thereto. For instance, the described systems and methods can be employed in any retail or service environment where employees perform tasks regularly according to a schedule, such as a restaurant (e.g., cleaning bathrooms, changing fryer oil, cleaning coffee pots every Nth brew, etc.), a hotel environment (e.g., cleaning rooms upon checkout, restocking linens, etc.), a factory environment (e.g., sharpening a blade or lubricating a machine part on an assembly line every Nth job run, etc.)

Figure 3:
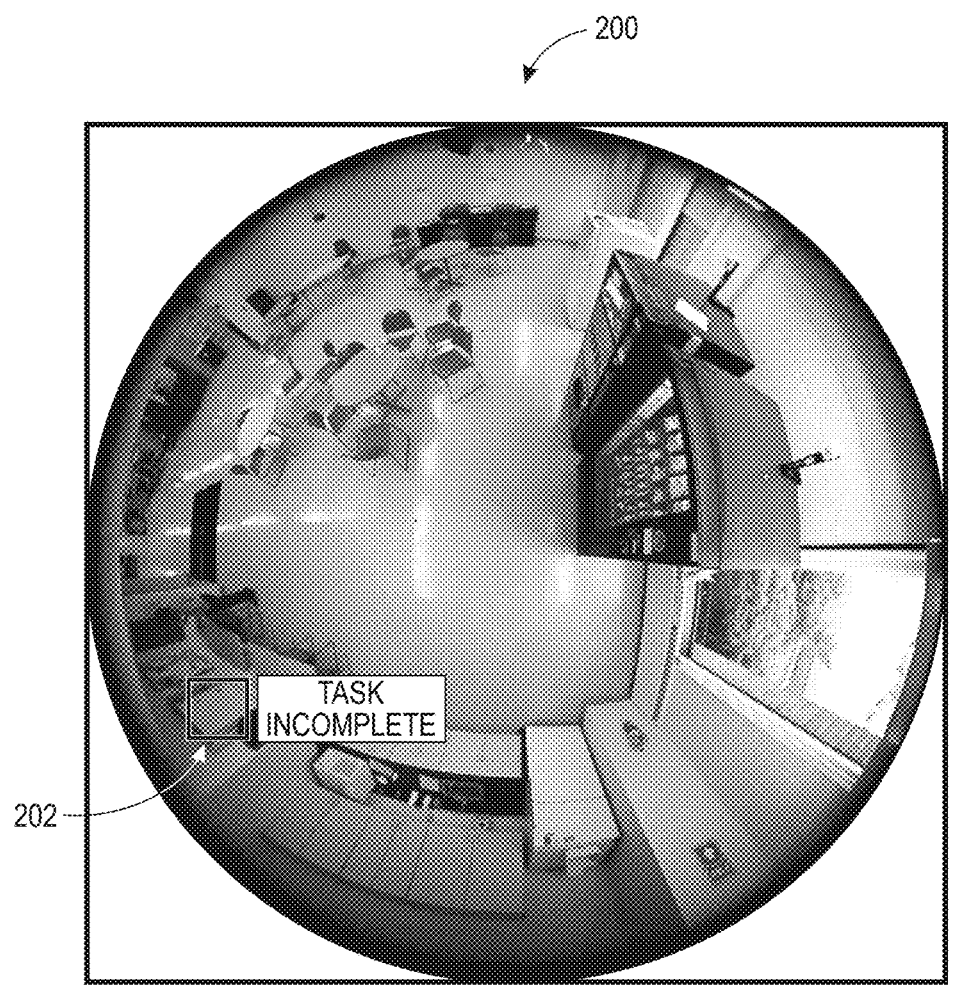
FIG. 3 shows a video frame of scene captured with a single video camera, in accordance with one or more aspects described herein.

FIG. 3 shows a video frame 200 of scene captured with a single video camera, in accordance with one or more aspects described herein. There is a ROI 202 indicated, which is monitored within the scene using the systems and methods described herein. In the example of FIG. 3, the ROI is a whiteboard on which a signal can be drawn by an employee. The signal can be letter, a number, a word or phrase, a symbol, or any other suitable signal that can be detected via pixel analysis.

Figure 4:
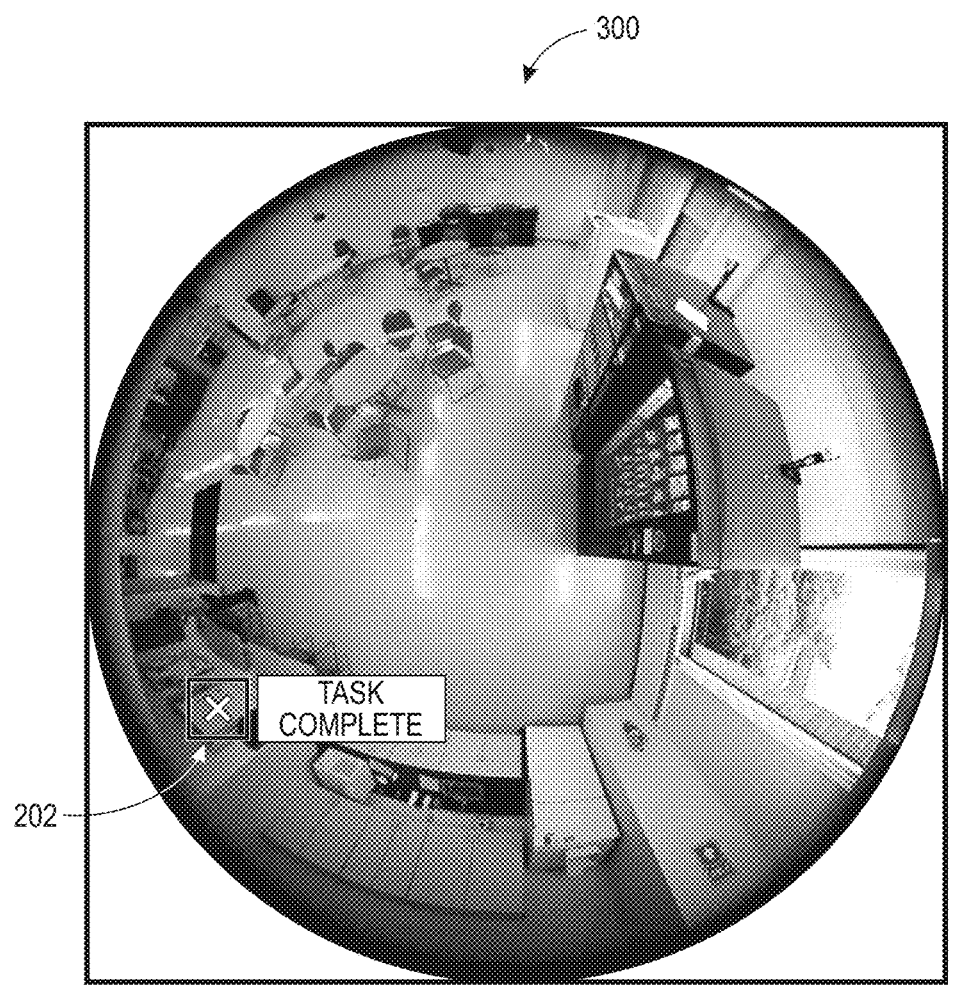
FIG. 4 shows a video frame of scene captured with a single video camera, in accordance with one or more aspects described herein.

FIG. 4 shows a video frame 300 of scene captured with a single video camera, in accordance with one or more aspects described herein. The ROI 202 is indicated, which is monitored within the scene using the systems and methods described herein. In the example of FIG. 4, the ROI is a whiteboard on which a signal (a red "X") has been drawn by an employee. The signal can be detected via pixel analysis of the ROI.

The exemplary embodiments have been described. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method for verifying task completion via a video system, comprising:
monitoring via one or more video cameras a region of interest (ROI);
determining whether an employee signal has been detected in the region of interest by analyzing pixels in the ROI in video frames captured by the one or more video cameras;
wherein analyzing the pixels in the ROI comprises, via a processor:
segmenting each video frame into regions; and
extracting feature vectors from each segmented region to identify the employee signal;
upon determining that the employee signal has been detected, classifying the identified employee signal; and
performing a table lookup to identify a task corresponding to the classified employee signal;
updating a task schedule for the identified task to indicate completion of the task; and
generating and transmitting a task completion alert message indicative of completion of the identified task; and
upon determining that the employee signal has not been detected within a predetermined upper time limit for completing the task as determined by a timer, generating and transmitting an incomplete task alert message, wherein the transmission of the incomplete task alert message is treated as a detected employee signal and causes the timer to be reset.

2. The method according to claim 1, further comprising, for each given scheduled task, initializing the timer upon onset of ROI monitoring.

3. The method according to claim 2, further comprising, for each given scheduled task, resetting the timer upon detection of an employee signal indicating completion of the task.

4. The method according to claim 1, wherein the employee signal is a hand gesture performed by an employee while within the monitored ROI.

5. The method according to claim 1, wherein the employee signal is a symbol drawn by an employee on a surface within the monitored ROI.

6. The method according to claim 1, wherein the employee signal one of a sign and an image presented by an employee within the monitored ROI.

7. The method according to claim 1, wherein the analyzing is performed on a frame-by frame basis.

8. The method according to claim 1, further comprising counting a number of detected employee signals indicating completion of a given task, and generating and transmitting the task completion alert message upon detection of an Nth detected employee signal for the given task, where N is an integer equal to or greater than 1.

9. A video system that facilitates verifying task completion in a retail or service environment, comprising:
one or more video cameras that monitor a region of interest (ROI);
a processor configured to:
determine whether an employee signal has been detected in the region of interest by analyzing pixels in the ROI in video frames captured by the one or more video cameras;
wherein analyzing the pixels in the ROI comprises, via a processor:
segmenting each video frame into regions; and
extracting feature vectors from each segmented region to identify the employee signal;
upon determining that the employee signal has been detected, classifying the identified employee signal; and
performing a table lookup to:
identify a task corresponding to the detected employee signal;
update a task schedule for the identified task to indicate completion of the task;
generate and transmit a task completion alert message indicative of completion of the identified task;
upon determining that the employee signal has not been detected within a predetermined upper time limit for completing the task as determined by a timer, generate and transmit an incomplete task alert message wherein the transmission of the incomplete task alert message is treated as a detected employee signal and causes the timer to be reset.

10. The system according to claim 9, wherein the processor is further configured to, for each given scheduled task, initialize the timer upon onset of ROI monitoring.

11. The system according to claim 10, wherein the processor is further configured to, for each given scheduled task, reset the timer upon detection of an employee signal indicating completion of the task.

12. The system according to claim 9, wherein the employee signal is a hand gesture performed by an employee while within the monitored ROI.

13. The system according to claim 9, wherein the employee signal is a symbol drawn by an employee on a surface within the monitored ROI.

14. The system according to claim 9, wherein the employee signal one of a sign and an image presented by an employee within the monitored ROI.

15. The system according to claim 9, wherein the processor is further configured to analyze pixels in the ROI on a frame-by frame basis.

16. The system according to claim 9, wherein the processor is further configured to count a number of detected employee signals indicating completion of a given task, and to generate and transmit the task completion alert message upon detection of an Nth detected employee signal for the given task, where N is an integer equal to or greater than 1.

17. A method of verifying task completion in a retail or service environment, comprising:
- monitoring a scene with one or more video cameras;
- defining a region of interest (ROI) within the scene for detecting employee signal events;
- determining whether an employee signal has been detected in the region of interest by analyzing via a processor the ROI to detect employee signal events by segmenting each of a plurality of video frames into regions and extracting feature vectors from each segmented region to identify the employee signal;
- upon determining that the employee signal has been detected, classifying a detected signal event as corresponding to a completed task;
- updating a task completion schedule based on the classified signal event;
- generating and transmitting a task completion alert message indicative of the completed task; and
- upon determining that the employee signal has not been detected within a predetermined upper time limit for completing the task as determined by a timer, generating and transmitting an incomplete task alert message, wherein the transmission of the incomplete task alert message is treated as a detected employee signal and causes the timer to be reset.

18. The method according to claim 17, further comprising:
- for each given scheduled task:
  - initializing the timer upon onset of ROI monitoring; and
  - resetting the timer upon detection of an employee signal indicating completion of the task.

\* \* \* \* \*